(12) United States Patent
Hikosaka

(10) Patent No.: US 9,703,513 B2
(45) Date of Patent: Jul. 11, 2017

(54) IMAGE FORMING APPARATUS WITH AN IMPROVED IMAGE PREVIEWER BASED ON THE TYPE OF DOCUMENT IMAGE

(71) Applicant: KYOCERA Document Solutions Inc., Osaka (JP)

(72) Inventor: Ariyoshi Hikosaka, Osaka (JP)

(73) Assignee: Kyocera Document Solutions, Inc. (JP)

(*) Notice: Subject to any disclaimer, the term of this patent is extended or adjusted under 35 U.S.C. 154(b) by 0 days.

(21) Appl. No.: 15/162,414

(22) Filed: May 23, 2016

(65) Prior Publication Data

US 2016/0350043 A1    Dec. 1, 2016

(30) Foreign Application Priority Data

May 27, 2015   (JP) .................................. 2015-106920

(51) Int. Cl.
*G06F 3/12*   (2006.01)
*H04N 1/00*   (2006.01)

(52) U.S. Cl.
CPC .......... *G06F 3/1256* (2013.01); *G06F 3/1208* (2013.01); *H04N 1/0044* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 2002/0054301 | A1* | 5/2002 | Iwai | G06K 15/02 358/1.2 |
| 2004/0190025 | A1* | 9/2004 | Nomura | H04N 1/00132 358/1.9 |
| 2005/0088711 | A1* | 4/2005 | Daniel | H04N 1/00225 358/527 |
| 2005/0267797 | A1* | 12/2005 | Takahashi | G06F 3/1222 718/102 |
| 2006/0274388 | A1* | 12/2006 | Miyazawa | H04N 1/00411 358/527 |
| 2007/0250785 | A1* | 10/2007 | Nakamura | G06F 3/0482 715/764 |

(Continued)

FOREIGN PATENT DOCUMENTS

JP    2008-236028    10/2008

*Primary Examiner* — Ming Hon

(57) ABSTRACT

In an image forming apparatus, an image scanning device scans a document image of a document. An image type identifying unit identifies a type of the scanned document image. An operation detecting unit detects an image quality adjustment operation by a user. A preview processing unit selects one of whole preview displaying and partial preview displaying on the basis of the type of the document image and a type of the image quality adjustment operation, and performs the selected whole preview displaying or partial preview displaying. The whole preview displaying indicates a whole of the document image, and the partial preview displaying indicates a part of the document image at a higher resolution than a resolution of the whole preview displaying. An image processing unit performs image quality adjustment of the document image according to the detected image quality adjustment operation.

4 Claims, 8 Drawing Sheets

(56) References Cited

U.S. PATENT DOCUMENTS

| | | | |
|---|---|---|---|
| 2008/0024804 A1* | 1/2008 | Yamanaka | H04N 1/6011 358/1.9 |
| 2008/0170262 A1* | 7/2008 | Takahashi | G03G 15/6538 358/1.15 |
| 2010/0027059 A1* | 2/2010 | Ebi | H04N 1/0035 358/1.15 |
| 2012/0026519 A1* | 2/2012 | Yoshida | H04N 1/00442 358/1.11 |
| 2013/0182270 A1* | 7/2013 | Inui | G06K 15/02 358/1.9 |

* cited by examiner

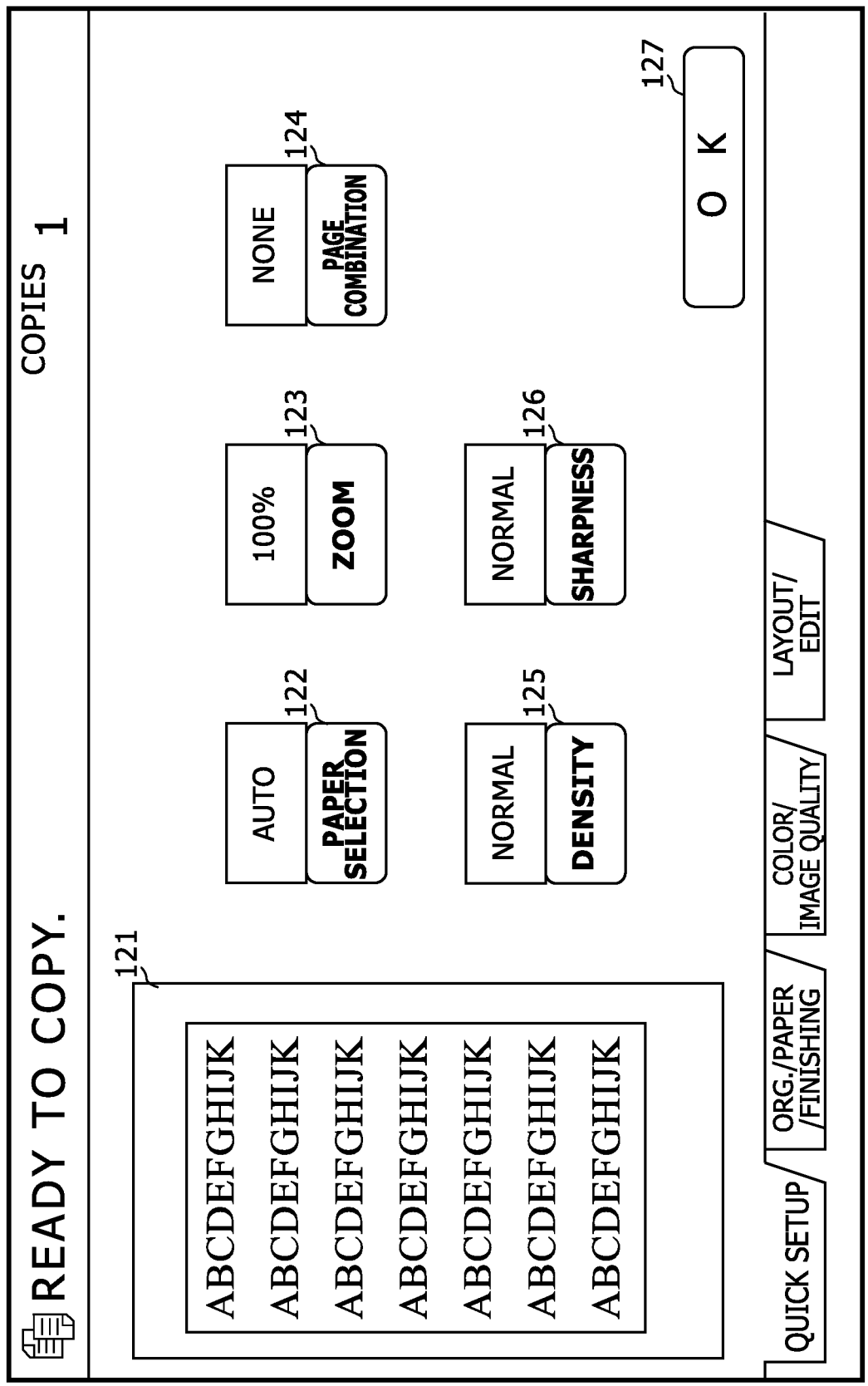

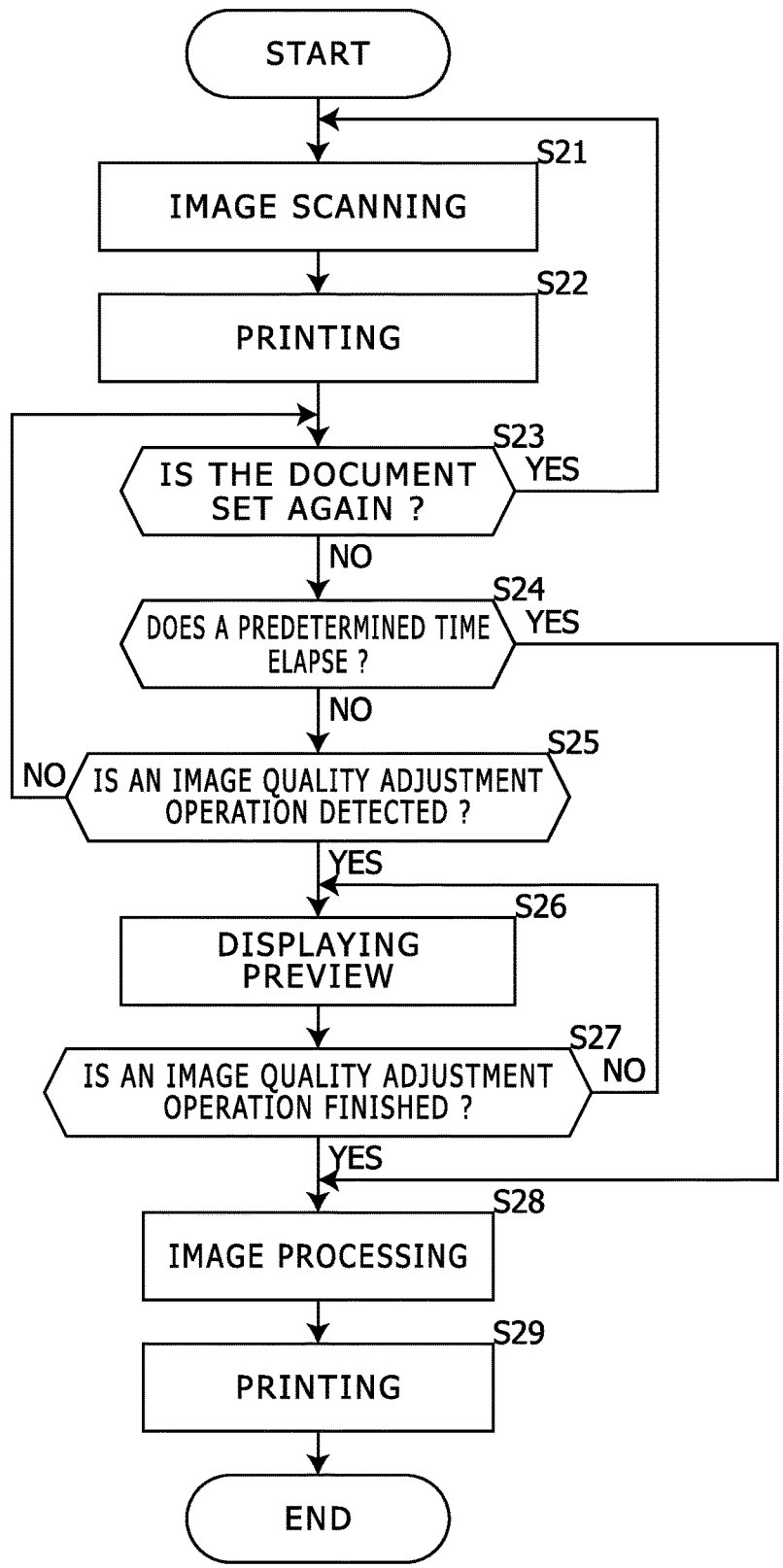

IMAGE FORMING APPARATUS WITH AN IMPROVED IMAGE PREVIEWER BASED ON THE TYPE OF DOCUMENT IMAGE

CROSS-REFERENCE TO RELATED APPLICATIONS

This application relates to and claims priority rights from Japanese Patent Application No. 2015-106920, filed on May 27, 2015, the entire disclosures of which are hereby incorporated by reference herein.

BACKGROUND

1. Field of the Present Disclosure

The present disclosure relates to an image forming apparatus.

2. Description of the Related Art

An image forming apparatus has a function to display a preview image before printing a document image.

In such image forming apparatus, in general, a preview image of the whole of a document image is displayed. However, for some types of document images and some types of image quality adjustment, a preview image of the whole of a document image is sometimes not enough to check effect of the image quality adjustment.

In addition, when a user wants to check a detail of the preview image, it is conceivable to enlarge and display a part of the preview image in accordance with a user operation while displaying the preview image, but such user operation is complicated and inconvenient.

SUMMARY

An image forming apparatus according to an aspect of the present disclosure includes an image scanning device, an image type identifying unit, an operation detecting unit, a preview processing unit, and an image processing unit. The image scanning device is configured to scan a document image of a document. The image type identifying unit is configured to identify a type of the document image scanned by the image scanning device. The operation detecting unit is configured to detect an image quality adjustment operation by a user. The preview processing unit is configured to select one of whole preview displaying and partial preview displaying on the basis of the type of the document image and a type of the image quality adjustment operation, and perform the selected whole preview displaying or partial preview displaying, the whole preview displaying indicating a whole of the document image, and the partial preview displaying indicating a part of the document image at a higher resolution than a resolution of the whole preview displaying. The image processing unit is configured to perform image quality adjustment of the document image according to the detected image quality adjustment operation.

These and other objects, features and advantages of the present disclosure will become more apparent upon reading of the following detailed description along with the accompanied drawings.

BRIEF DESCRIPTION OF THE DRAWINGS

FIG. 7 shows a diagram that indicates an example of whole preview displaying; and FIG. 8 shows a flowchart that shows a behavior of the image forming apparatus in Embodiment 2.

DETAILED DESCRIPTION

Hereinafter, embodiments according to aspects of the present disclose will be explained with reference to drawings.

Embodiment 1

Figure 1:
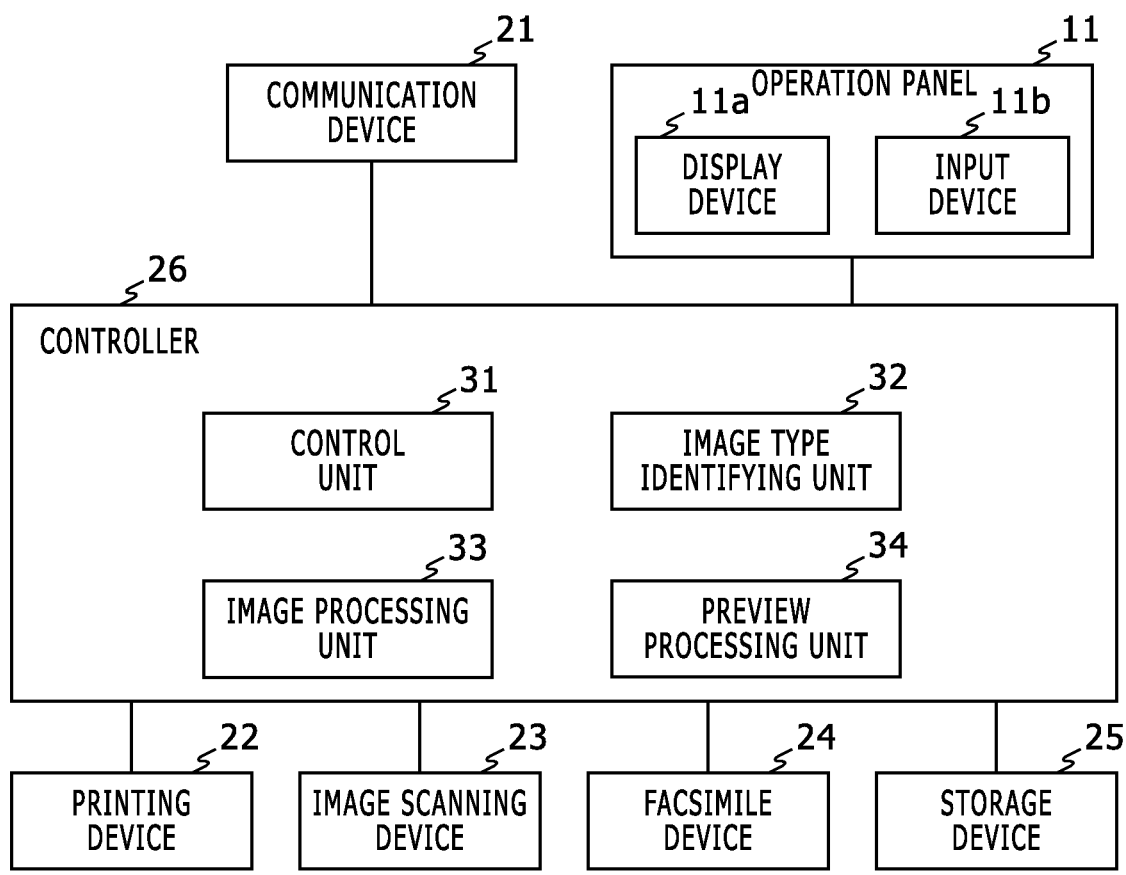
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure.

The image forming apparatus shown in FIG. 1 is a multi function peripheral having a printing function, an image scanning function and a facsimile function, and includes an operation panel 11, a communication device 21, a printing device 22, an image scanning device 23, a facsimile device 24, a storage device 25, and a controller 26.

The operation panel 11 includes a display device 11a such as a liquid crystal display and an input device 11b such as a touch panel, and displays an operation screen for a user and detects a user operation.

Figure 2:
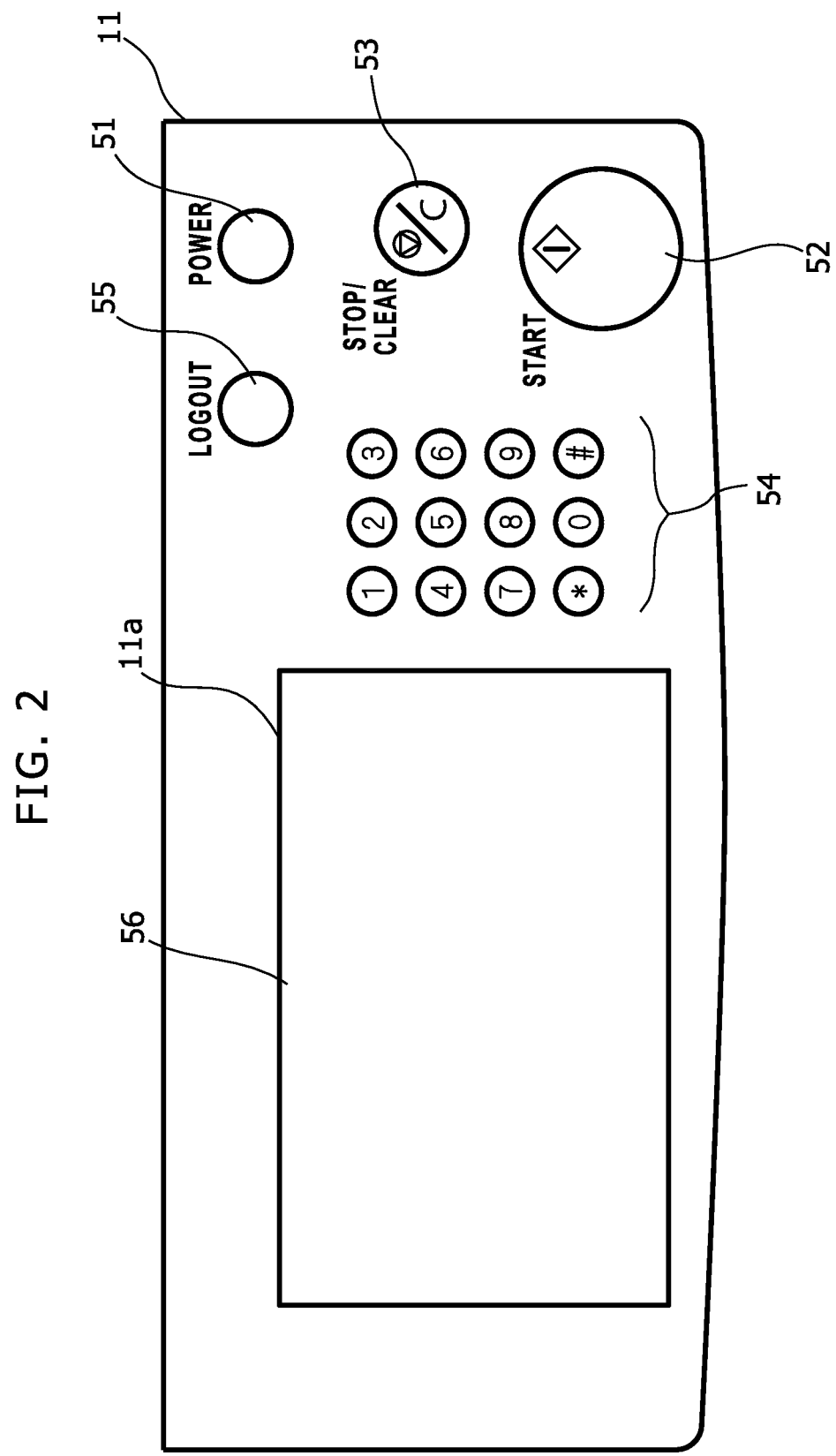
FIG. 2 shows a front view of the operation panel 11 in FIG. 1.

FIG. 2 shows a front view of the operation panel 11 in FIG. 1. The operation panel 11 shown in FIG. 2 includes hard keys 51 to 55 and a touch panel 56 as the input device 11b. The hard key 51 is a POWER key, the hard key 52 is a START key, the hard key 53 is a STOP/CLEAR key, the hard keys 54 are numeric keys, and the hard key 55 is a LOGOUT key. The touch panel 56 is arranged on a surface of the display device 11a (i.e. on a displayed screen).

Further, the communication device 21 is an internal device capable of connecting through a network or the like to an unshown host device and performing data communication in accordance with a predetermined communication protocol.

Furthermore, the printing device 22 is an internal device that prints a document image on a printing paper sheet, for example, in an electrophotographic manner.

Furthermore, the image scanning device 23 is an internal device that optically scans a document image from a document, and generates image data of the document image. The image scanning device 23 includes at least one of an auto document feeder or a platen glass and scans a document image of a document put on the auto document feeder or the platen glass.

Furthermore, the facsimile device 24 is an internal device that has a receiving function that receives a facsimile signal and converts the facsimile signal to image data and a transmitting function that converts image data to a facsimile signal and transmits the facsimile signal.

Furthermore, the storage device 25 is a non volatile storage device such as a hard disk drive or a flash memory, and stores data, a program and the like.

Furthermore, the controller 26 includes a computer that includes a CPU (Central Processing Unit), a ROM (Read Only Memory), a RAM (Random Access Memory) and the like not shown, loads a program stored in the ROM or the storage device 25 to the RAM, and executes the program with the CPU to act as various processing units.

In this embodiment, the controller 26 acts as a control unit 31, an image type identifying unit 32, an image processing unit 33, and a preview processing unit 34.

The control unit 31 controls the aforementioned internal devices and thereby performs sorts of jobs such as print job and copy job, and performs a user interface process using the operation panel 11. Specifically, the control unit 31 displays an operation screen on the display device 11a in the operation panel 11, detects a user operation to the operation screen using the input device 11b in the operation panel 11, and in accordance with the detected user operation, changes the operation screen and/or operates the image type identifying unit 32, the image processing unit 33, the preview processing unit 34, the internal devices and/or the like.

Figure 3:
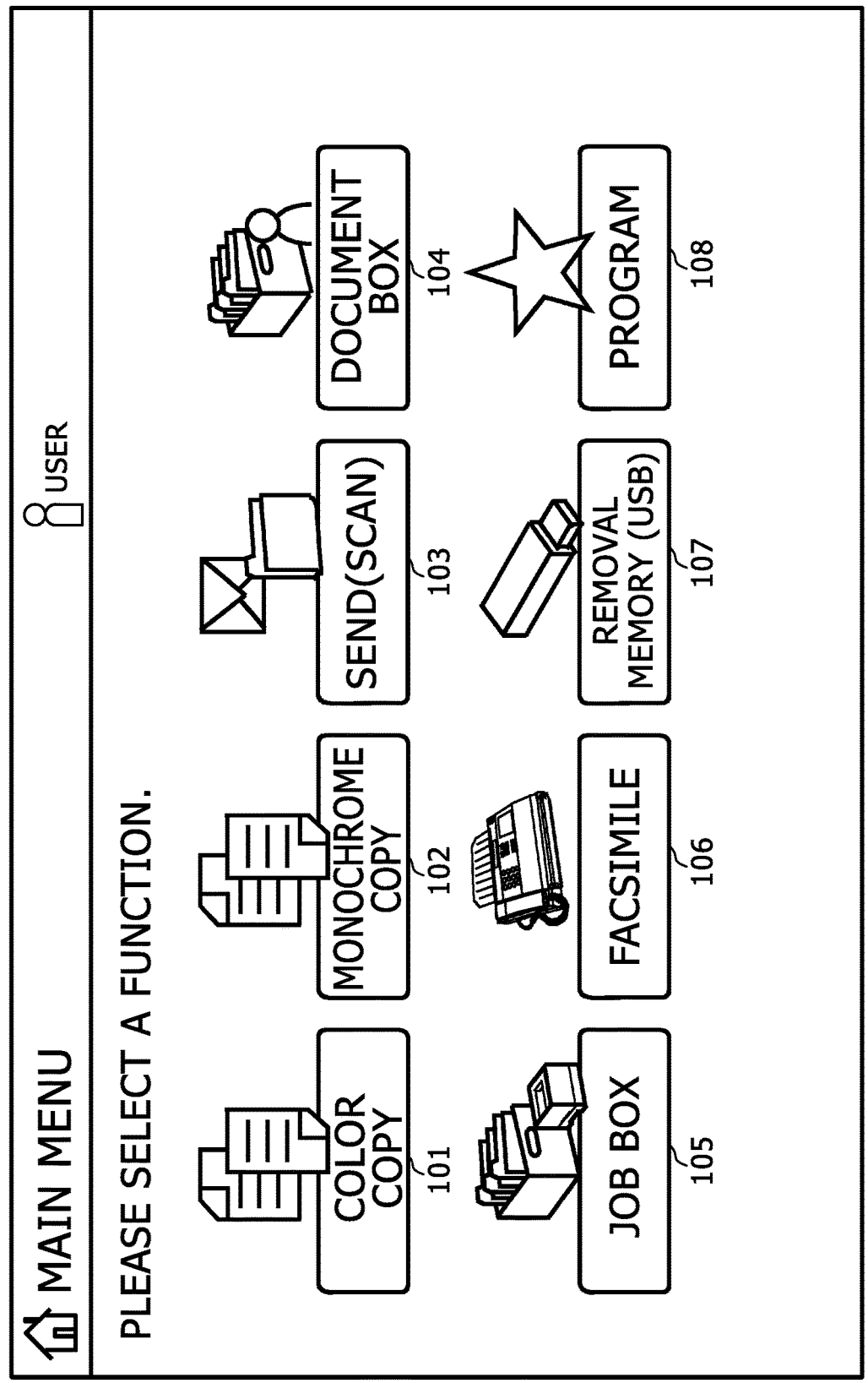
FIG. 3 shows a diagram that indicates an example of a main menu screen.
Figure 4:
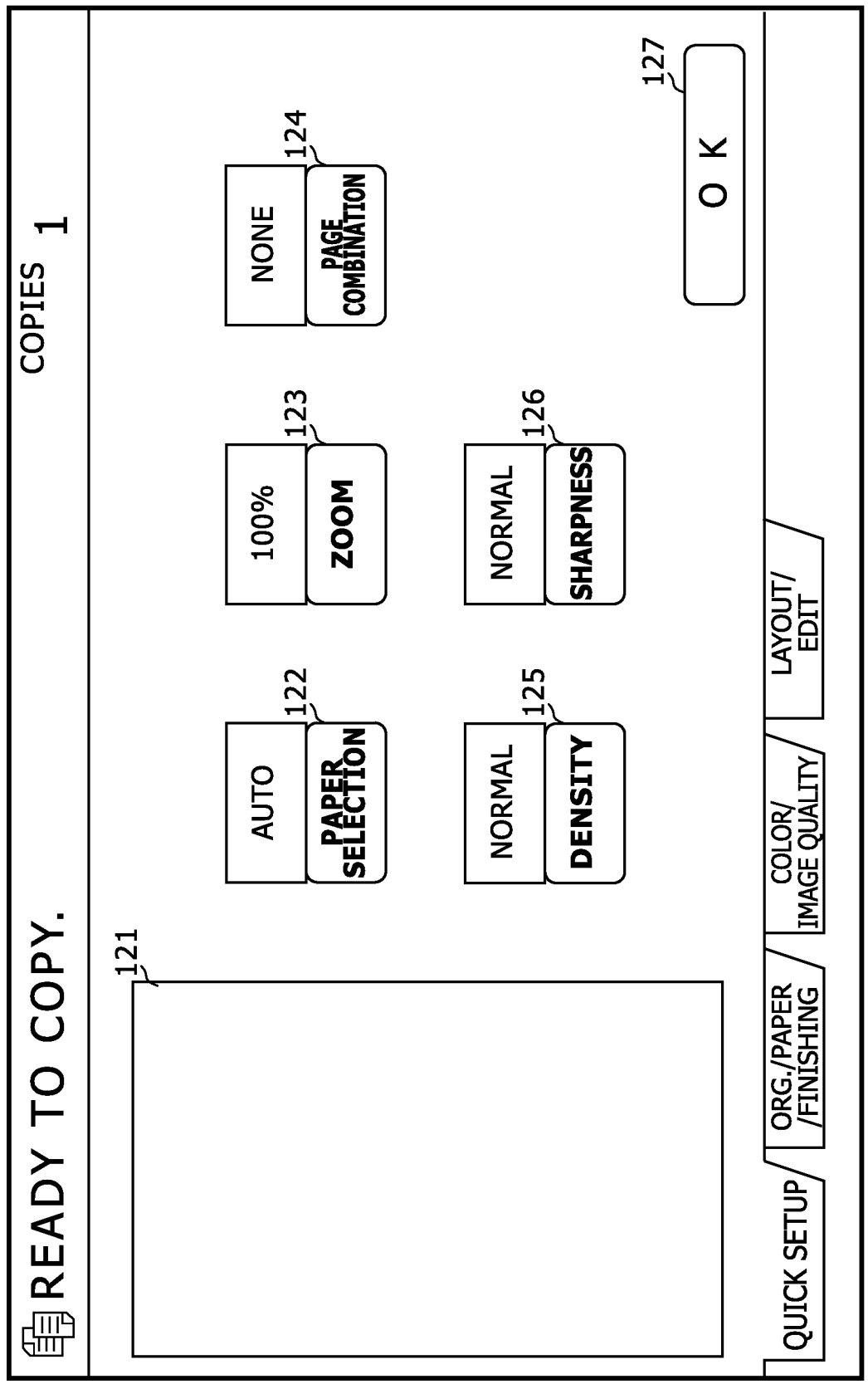
FIG. 4 shows a diagram that indicates an example of a setting screen of a copy function.

FIG. 3 shows a diagram that indicates an example of a main menu screen. FIG. 4 shows a diagram that indicates an example of a setting screen of a copy function.

In the image forming apparatus 1, after a user logs in, the control unit 31 firstly causes the display device 11a to display a main menu screen as shown in FIG. 3. In the main menu screen, displayed are soft keys 101 to 107 of sorts of functions such as copy function and transmission function, and a soft key 108 to display a list screen of programs.

When the soft key 101 or 102 of a copy function is pressed down in the main menu screen shown in FIG. 3, the control unit 31 causes the display device 11a to display a setting screen of the copy function shown in FIG. 4.

The setting screen of the copy function shown in FIG. 4 includes a preview display area 121, a paper selection key 122, a zoom key 123, a page combination setting key 124, a density adjustment key 125, a sharpness adjustment key 126, and an OK key 127.

The preview display area 121 is an area where a document image to be printed is previewed before printing. The paper selection key 122 is a soft key to select a printing paper sheet. The zoom key 123 is a soft key to set a zooming ratio of the document image to be printed. The page combination setting key 124 is a soft key to set turning on/off of page combination and the number of page images included in each sheet page in page combination. The density adjustment key 125 is a soft key to adjust density of the document image to be printed. The sharpness adjustment key 126 is a soft key to adjust sharpness of the document image to be printed. The OK key 127 is a soft key to be operated for finishing the setting. As shown in FIG. 4, current setting values are displayed next to the keys 122 to 126, respectively.

The density adjustment key 125 and the sharpness adjustment key 126 are soft keys for image quality adjustment operation by a user. An image quality adjustment operation to the density adjustment key 125 or the sharpness adjustment key 126 by a user is detected by the control unit 31.

In Embodiment 1, the control unit 31 detects a flick operation to the density adjustment key 125 or the sharpness adjustment key 126 using the touch panel of the input device 11b, and increases or decreases a value of a parameter of the image quality adjustment in accordance with a direction of the flick operation.

Returning to FIG. 1, the image type identifying unit 32 identifies a type of the document image scanned by the image scanning device 23. The image type identifying unit 32 may automatically identify a type of the document image on the basis of a known area separation technique or may identify a type of the document image on the basis of a user operation to the operation panel 11 (i.e. input of the document type). The type of the document image may be photograph, line drawing, text (character), or the like.

The image processing unit 33 performs image processing such as color conversion and/or half toning, and also performs image quality adjustment of the document image according to the detected image quality adjustment operation. The document image after the image quality adjustment of the image processing unit 33 is printed by the printing device 21.

The preview processing unit 34 selects one of whole preview displaying and partial preview displaying on the basis of the type of the document image and a type of the image quality adjustment operation (the density adjustment, the sharpness adjustment or the like), and performs the selected whole preview displaying or partial preview displaying. The whole preview displaying indicates a whole of the document image. The partial preview displaying indicates a part of the document image at a higher resolution than a resolution of the whole preview displaying.

For example, the preview processing unit 34 (a) selects the whole preview displaying if the type of the document image is photograph and the image quality adjustment operation is a density adjustment operation, (b) selects the partial preview displaying if the type of the document image is line drawing or text and the image quality adjustment operation is a density adjustment operation, and (c) selects the partial preview displaying if the type of the document image is photograph and the image quality adjustment operation is a sharpness adjustment operation. It should be noted that the whole preview displaying is selected if the whole preview displaying is a default preview displaying and the image quality adjustment operation is not detected.

If the type of the document image is line drawing or text and the image quality adjustment operation is a density adjustment operation, then the preview processing unit 34 selects a part of a predetermined size that includes an edge of a line drawing or a character in the document image, generates a preview image of the selected part, and displays the generated preview image in the preview display area 121.

If the type of the document image is photograph and the image quality adjustment operation is a sharpness adjustment operation, then the preview processing unit 34 selects a part (intermediate gradation part) of a predetermined size in which moire easily occurs in the document image, generates a preview image of the selected part, and displays the generated preview image in the preview display area 121.

For example, in an initial status, the whole preview displaying is performed, and afterward, when a user operation to the density adjustment key 125 or the sharpness adjustment key 126 is detected, (a) if the partial preview displaying is selected on the basis of the type of the document image and the type of the image quality adjustment operation, then the preview processing unit 34 changes the preview displaying from the whole preview displaying to the partial preview displaying, and (b) if the whole preview displaying is selected on the basis of the type of the document image and the type of the image quality adjustment operation, then the preview processing unit 34 continues the whole preview displaying.

For example, in a case that another type of the image quality adjustment operation (e.g. of the sharpness adjustment) is performed after a certain type of the first image quality adjustment operation (e.g. of the density adjustment) is performed, the second image quality adjustment (e.g. the sharpness adjustment) based on the aforementioned another image quality adjustment operation is performed for the document image for which the first image quality adjustment (e.g. the density adjustment) based on the first image quality adjustment operation has been performed; and the image for which the second image quality adjustment has been performed is displayed in the whole preview displaying or the partial preview displaying.

Further, in Embodiment 1, the preview processing unit performs the whole preview displaying or the partial preview displaying based on a value (a density setting value, a sharpness intensity or the like) of a parameter increased or decreased by the aforementioned flick operation. Specifically, the preview processing unit 34 generates a preview image corresponding to a value of the parameter changed by the aforementioned flick operation, and displays the generated preview image in the aforementioned preview display area 121.

In the whole preview displaying, a whole preview image of a predetermined resolution (e.g. 300 dpi) is generated by lowering the resolution (e.g. 1200 dpi, 75 dpi or the like) of the document image scanned by the image scanning device 21, the image quality adjustment is performed for the whole preview image, and the whole preview image for which the image quality adjustment has been performed is displayed in the preview display area 121.

In the partial preview displaying, a partial preview image is generated at the same resolution as the resolution of the document image scanned by the image scanning device (or at a resolution lower than the resolution of the scanned document image and higher than the resolution of the whole preview displaying), the image quality adjustment is performed for the partial preview image, and the partial preview image for which the image quality adjustment has been performed is displayed in the preview display area 121.

Figure 5:
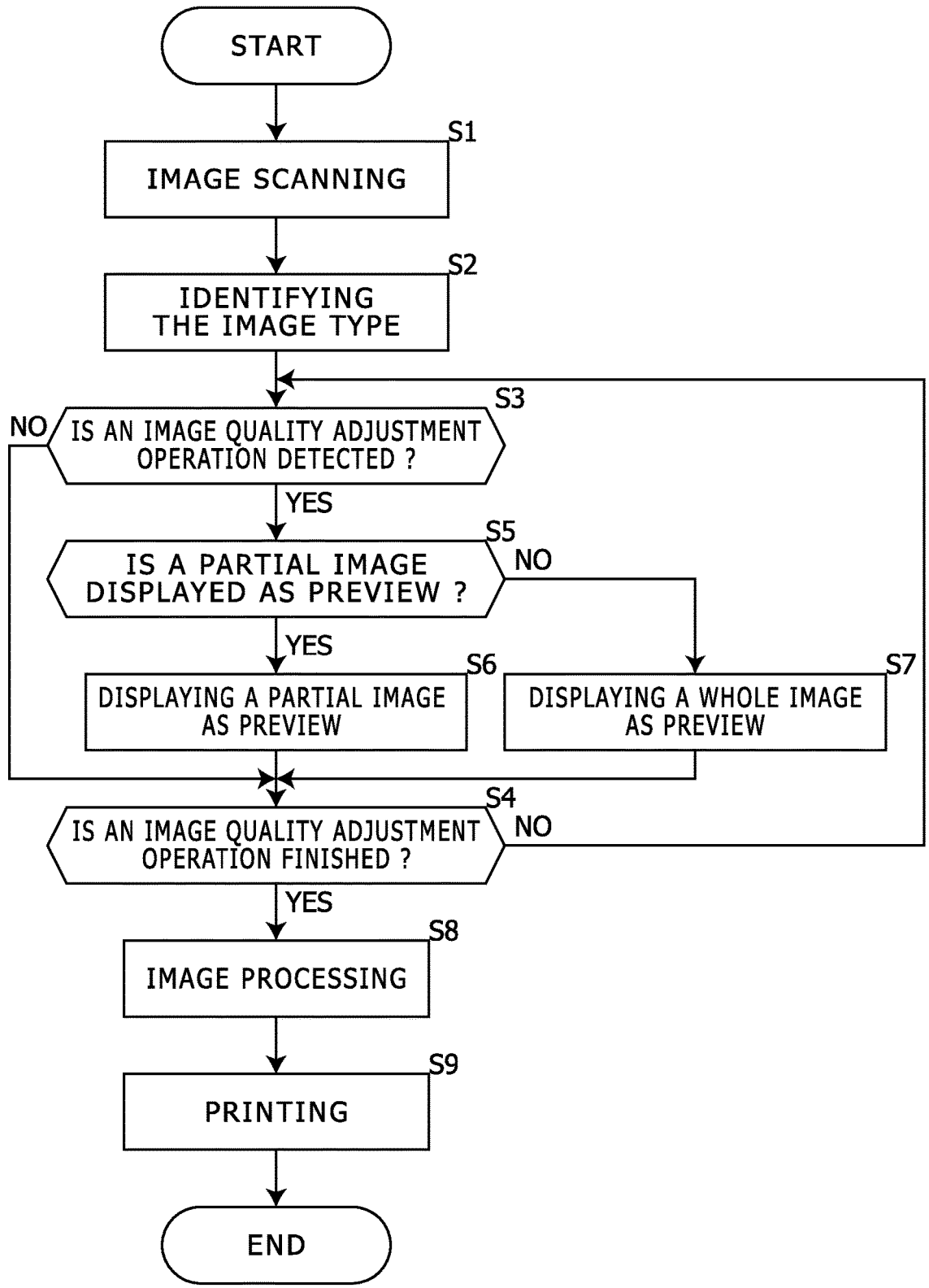
FIG. 5 shows a flowchart that shows a behavior of the image forming apparatus in Embodiment 1.

The following part explains a behavior of the image forming apparatus in Embodiment 1. FIG. 5 shows a flowchart that shows a behavior of the image forming apparatus in Embodiment 1.

For a copy job, for example, a user presses down a soft key 101 or 102 and thereby selects a copy job, puts a document on the image scanning device 23, and performs a copy setting such as image quality setting if necessary, and then presses down the START key 52 to start the copy job.

When detecting the aforementioned user operation, the control unit 31 controls the image scanning device 23 and thereby causes to scan a document image and obtains the document image (in Step S1). After obtaining the document image, the control unit 31 does not immediately perform printing of the document image, but displays a setting screen as shown in FIG. 3 on the display device 11a, and causes the image type identifying unit 32, the image processing unit 33, and the preview processing unit 34 to perform the following process.

The image type identifying unit 32 identifies a type of the document image scanned by the image scanning device 23 (in Step S2).

The control unit 31 continuously watches if an image quality adjustment operation (here an operation to the density adjustment key 125 or the sharpness adjustment key 126) or a terminating operation of image quality adjustment (here an operation to the OK key 127) is detected (in Step S3 or S4).

When detecting an image quality adjustment operation, the preview processing unit 34 selects the whole preview displaying or the partial preview displaying on the basis of the type of the document image and the type of the image quality adjustment operation.

Figure 6:
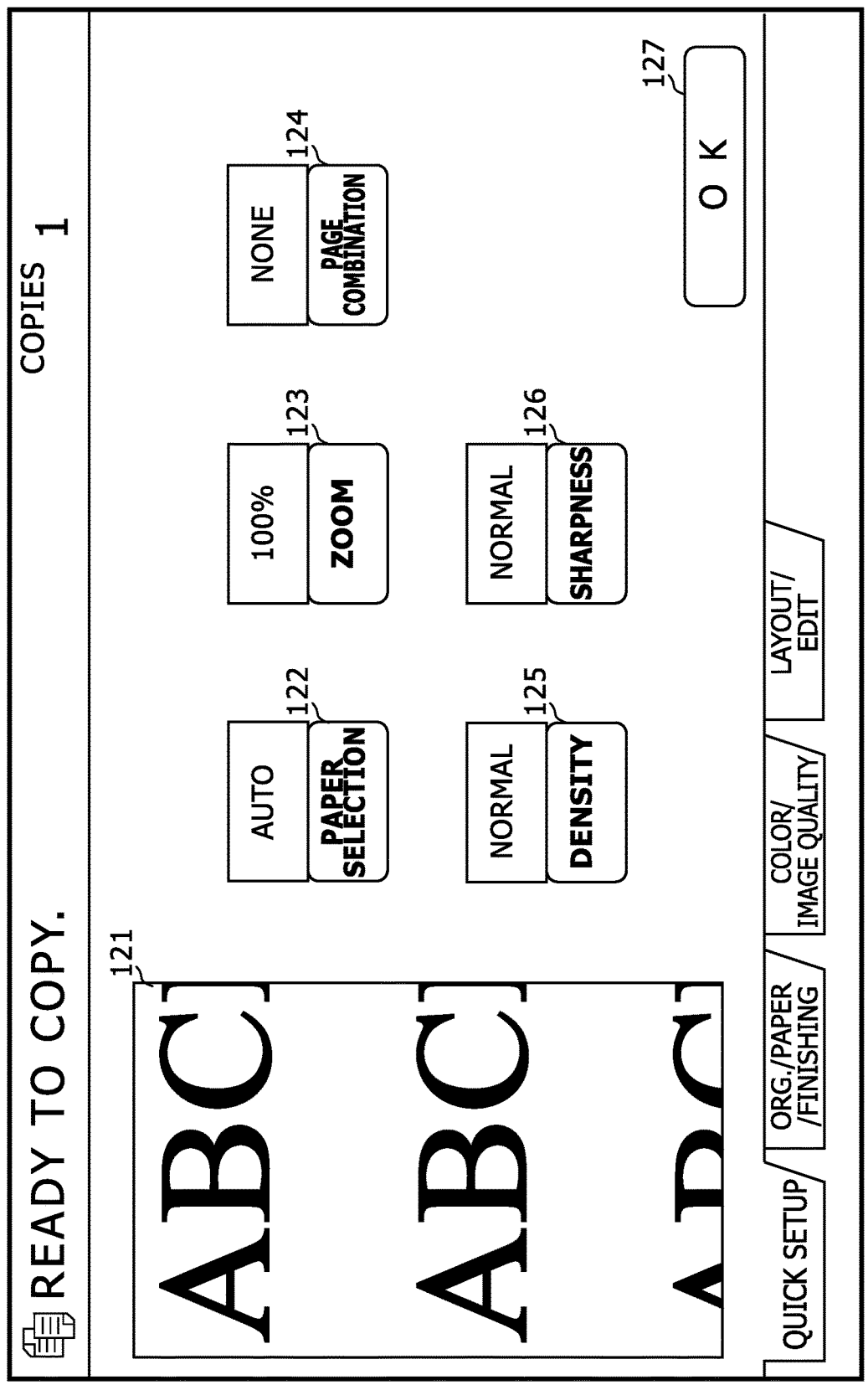
FIG. 6 shows a diagram that indicates an example of partial preview displaying.

FIG. 6 shows a diagram that indicates an example of the partial preview displaying. FIG. 7 shows a diagram that indicates an example of the whole preview displaying. FIG. 6 shows an example of the partial preview displaying when the type of the document image is text, and FIG. 7 shows an example of the whole preview displaying when the type of the document image is text.

If the partial preview displaying is selected (in Step S5), then the preview processing unit 34 performs the partial preview displaying, for example, as shown in FIG. 6 (in Step S6); and if the whole preview displaying is selected (in Step S5), then the preview processing unit 34 performs the whole preview displaying, for example, as shown in FIG. 7 (in Step S7).

When detecting a terminating operation of image quality adjustment, the image processing unit 33 performs image processing such as color conversion and halftoning and performs image quality adjustment for the document image on the basis of the detected image quality adjustment operation (in Step S8).

Subsequently, using the printing device 21, the control unit 31 performs printing of the document image for which the image processing unit 33 has performed the image quality adjustment (in Step S9).

Thus if a terminating operation of image quality adjustment is detected without detecting any image quality adjustment operations, then none of the partial preview displaying and the whole preview displaying is performed.

As mentioned, in Embodiment 1, the image type identifying unit 32 identifies a type of the document image scanned by the image scanning device 23. The control unit 31 detects an image quality adjustment operation by a user using the input device 11b. The image processing unit 33 performs image quality adjustment of the document image according to the detected image quality adjustment operation. The preview processing unit 34 selects one of the whole preview displaying and the partial preview displaying on the basis of the type of the document image and a type of the image quality adjustment operation, and performs the selected whole preview displaying or partial preview displaying.

Consequently, user operation burden for preview displaying is reduced, and the preview displaying is performed so that a user easily checks effect of the image quality adjustment.

Embodiment 2

The image forming apparatus according to Embodiment 2 includes the same components as those in the image forming apparatus according to Embodiment 1. However, the image forming apparatus in Embodiment 2 runs in the following manner.

FIG. 8 shows a flowchart that shows a behavior of the image forming apparatus in Embodiment 2.

For a copy job, for example, a user presses down a soft key 101 or 102 and thereby selects a copy job, puts a document on the image scanning device 23, and performs a copy setting such as image quality setting if necessary, and then presses down the START key 52 to start the copy job.

When detecting the aforementioned user operation, the control unit 31 controls the image scanning device 23 and thereby causes to scan a document image and obtains the document image (in Step S21). When obtaining the document image, the image processing unit 33 performs the image quality adjustment for the document image if necessary, and afterward, the control unit 31 immediately performs printing of the document image on the basis of the copy setting using the printing device 21 (in Step S22).

As mentioned, at the first printing after scanning the document image, a copy job is performed without performing preview displaying after image scanning.

After finishing the first printing, the control unit 31 measures an elapsed time from the time of finishing the first printing, and watches (a) if a document is set by a user again (in Step S23), (b) if the elapsed time gets a predetermined time or more (in Step S24), and (c) if an image quality adjustment operation is detected (in Step S25). It should be noted that setting a document again on the auto document feeder can be detected by the auto document feeder. In addition, setting a document again on the platen glass can be detected on the basis of opening and closing a document cover that covers the platen glass.

If an image quality adjustment operation is detected without setting a document again before the aforementioned predetermined time elapses, then the preview processing unit performs the partial preview displaying or the whole preview displaying as well as Embodiment 1 (in Step S26). As well as Embodiment 1, the partial preview displaying or the whole preview displaying is performed until detecting a terminating operation of image quality adjustment (in Step S27).

When detecting a terminating operation of image quality adjustment, the image processing unit 33 performs image processing such as color conversion and halftoning and performs image quality adjustment for the document image on the basis of the detected image quality adjustment operation (in Step S28).

Subsequently, using the printing device 21, the control unit 31 performs printing of the document image for which the image processing unit 33 has performed the image quality adjustment (in Step S29).

Contrarily, if setting a document again is not detected and the aforementioned predetermined time elapses without detecting any image quality adjustment operations, then none of the partial preview displaying and the whole preview displaying is performed and the image processing and the printing are performed as well as the first printing (in Steps S28 and S29).

Further, if setting a document again is detected before the aforementioned predetermined time elapses, then the control unit 31 determines that a new document is set on the image scanning device 23 and returning to Step S21, performs the aforementioned process for the new document.

It should be noted that the document image scanned by the image scanning device 23 is not discarded and is maintained until setting the new document is detected, and is used for every printing after the first printing. Therefore, the preview image displayed in the aforementioned partial preview displaying or whole preview displaying is generated from the maintained document image.

As mentioned, in Embodiment 2, the preview processing unit 34 (a) selects one of the whole preview displaying and the partial preview displaying on the basis of the type of the document image and the type of the image quality adjustment operation and performs the selected whole preview displaying or partial preview displaying if the control unit 31 detects an image quality adjustment operation of a user without detecting setting a document on the image scanning device 23 again after printing the document image, and (b) performs none of the whole preview displaying and the partial preview displaying if the control unit 31 does not detect an image quality adjustment operation of a user within a predetermined time without detecting setting a document on the image scanning device 23 again after printing the document image.

Consequently, in a copy operation, if a user does not obtain user's desired printed matter, then for the next printing, the image quality adjustment is performed while performing preview displaying on the basis of the document image that has already been scanned, and therefore the user obtains user's desired printed matter.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1 or 2, the document image for which the image quality adjustment has been performed is printed in a copy job, and as well, in a scan-to-send job, the partial preview displaying or the whole preview displaying may be performed and the communication device 21 may transmit the document image for which the image quality adjustment has been performed.

Further, in Embodiment 1 or 2, in the partial preview displaying, the part displayed in the preview display area 121 may be changed in accordance with a user operation (e.g. a scroll operation).

What is claimed is:
1. An image forming apparatus, comprising:
an image scanning device configured to scan a document image of a document;
an image type identifying unit configured to identify a type of the document image scanned by the image scanning device;
an operation detecting unit configured to detect an image quality adjustment operation by a user;
a preview processing unit configured to select one of whole preview displaying and partial preview displaying on the basis of the type of the document image and a type of the image quality adjustment operation, and perform the selected whole preview displaying or partial preview displaying, the whole preview displaying indicating a whole of the document image, and the partial preview displaying indicating a part of the document image at a higher resolution than a resolution of the whole preview displaying; and
an image processing unit configured to perform image quality adjustment of the document image according to the detected image quality adjustment operation;
wherein the preview processing unit (a) selects one of the whole preview displaying and the partial preview displaying on the basis of the type of the document image and the type of the image quality adjustment operation and performs the selected whole preview displaying or partial preview displaying if the operation detecting unit detects an image quality adjustment operation of a user without detecting setting a document on the image scanning device again after printing the document image, and (b) performs none of the whole preview displaying and the partial preview displaying if the operation detecting unit does not detect an image quality adjustment operation of a user within a predetermined time without detecting setting a document on the image scanning device again after printing the document image.

2. The image forming apparatus according to claim 1, further comprising:

a display device configured to display an operation screen for the image quality adjustment operation; and a touch panel arranged on the display device;

wherein the operation detecting unit displays an operation key for image quality adjustment in the operation screen, detects as the image quality adjustment operation a flick operation to the operation key using the touch panel, and increases or decreases a value of a parameter of the image quality adjustment in accordance with a direction of the flick operation; and the preview processing unit performs the whole preview displaying or the partial preview displaying based on the value of the parameter increased or decreased by the flick operation.

3. The image forming apparatus according to claim 1, wherein the preview processing unit selects the whole preview displaying if the type of the document image is photograph and the image quality adjustment operation is a density adjustment operation, and selects the partial preview displaying if the type of the document image is line drawing or text and the image quality adjustment operation is a density adjustment operation.

4. The image forming apparatus according to claim 1, wherein the preview processing unit selects the partial preview displaying if the type of the document image is photograph and the image quality adjustment operation is a sharpness adjustment operation.

\* \* \* \* \*